(12) United States Patent
Golub et al.

(10) Patent No.: US 8,292,139 B2
(45) Date of Patent: Oct. 23, 2012

(54) BICYCLE PANNIER MOUNTING SYSTEM

(75) Inventors: Erica Marie Golub, Fond du Lac, WI (US); Po Chin Liao, Taichung (TW)

(73) Assignee: Trek Bicycle Corporation, Waterloo, WI (US)

(*) Notice: Subject to any disclaimer, the term of this patent is extended or adjusted under 35 U.S.C. 154(b) by 965 days.

(21) Appl. No.: 12/264,380

(22) Filed: Nov. 4, 2008

(65) Prior Publication Data
US 2010/0108729 A1    May 6, 2010

(51) Int. Cl.
 *B62J 9/00*    (2006.01)
(52) U.S. Cl. ........ 224/419; 224/448; 224/449; 224/558; 296/37.1
(58) Field of Classification Search ............... 224/413, 224/419, 420, 421, 425, 426, 428, 431, 433, 224/437, 447, 448, 449, 456, 458, 558; 280/288.4; 296/37.1; 248/231.2, 227.4, 229.12, 229.13, 248/229.22, 229.23, 230.3, 230.4, 213.2
See application file for complete search history.

(56) References Cited

U.S. PATENT DOCUMENTS

| | | | |
|---|---|---|---|
| 3,784,140 A * | 1/1974 | Auerbach ............... | 248/230.4 |
| 3,786,972 A | 1/1974 | Alley | |
| 3,795,354 A | 3/1974 | Stippich | |
| 3,921,868 A | 11/1975 | Reichbach | |
| 3,955,727 A | 5/1976 | Montgomery | |
| 4,174,795 A | 11/1979 | Jackson et al. | |
| 4,241,857 A | 12/1980 | Perethian et al. | |
| 4,244,496 A | 1/1981 | Litz | |
| 4,257,544 A | 3/1981 | Dierkes | |
| 4,258,870 A | 3/1981 | Edelson | |
| 4,262,829 A | 4/1981 | Hine, Jr. et al. | |
| 4,266,702 A | 5/1981 | Jackson et al. | |
| 4,301,952 A | 11/1981 | McNeill | |
| 4,328,914 A | 5/1982 | Michaud | |
| 4,328,915 A | 5/1982 | Melton, III | |
| 4,345,703 A | 8/1982 | Allen | |
| 4,353,490 A | 10/1982 | Jackson et al. | |
| 4,402,439 A * | 9/1983 | Brown ........................ | 224/438 |
| 4,418,850 A | 12/1983 | Jackson et al. | |

(Continued)

FOREIGN PATENT DOCUMENTS

WO    WO 83/04230    12/1983

(Continued)

OTHER PUBLICATIONS

Competitive Product, six (6) pages, date undetermined.

*Primary Examiner* — Gary Elkins
(74) *Attorney, Agent, or Firm* — Boyle Fredrickson, S.C.

(57) ABSTRACT

A pannier mounting system includes a pair of hooks that are positioned at generally opposite ends of a handle and secure a pannier to a bicycle. A latch and a stop cooperate with each hook to snuggly enclose a rail in a manner that is generally independent of the cross-sectional size/shape of the rail. The latch is connected to the hook by a pivot and extends outward generally under the hook. The stop is pivotably and slidably connected to the hook and cooperates with the hook to generally fix a position of the latch. Translation of the handle toward the hooks closes and locks the latch about a rail member and translation of the handle away from the hooks unlocks the latch so that the mounting system can be removed from a rail.

21 Claims, 9 Drawing Sheets

U.S. PATENT DOCUMENTS

| | | |
|---|---|---|
| 4,429,818 A | 2/1984 | Patterson et al. |
| 4,460,114 A | 7/1984 | Grenier |
| 4,460,115 A | 7/1984 | Jackson |
| 4,477,004 A | 10/1984 | Barro |
| 4,480,773 A | 11/1984 | Krauser |
| 4,487,344 A | 12/1984 | Blackburn et al. |
| 4,562,944 A | 1/1986 | Jackson et al. |
| 4,580,706 A | 4/1986 | Jackson et al. |
| 4,596,346 A | 6/1986 | Lepage |
| D285,426 S | 9/1986 | Blackburn |
| 4,658,998 A | 4/1987 | Belka |
| 4,662,548 A | 5/1987 | Jackson et al. |
| 4,666,071 A | 5/1987 | Irwin et al. |
| 4,671,438 A | 6/1987 | La Plante |
| 4,700,845 A | 10/1987 | Fretter |
| 4,770,326 A | 9/1988 | Thompson |
| D299,225 S | 1/1989 | Blackburn |
| D299,818 S | 2/1989 | Blackburn |
| 4,813,583 A | 3/1989 | Carpenter |
| 4,840,298 A | 6/1989 | Belka |
| D336,877 S | 6/1993 | Fenton |
| D336,879 S | 6/1993 | Chen |
| RE34,474 E | 12/1993 | Lutz |
| D342,473 S | 12/1993 | Konecny et al. |
| D352,267 S | 11/1994 | Blackburn |
| 5,435,471 A | 7/1995 | Chuang |
| D363,266 S | 10/1995 | Ropp et al. |
| 5,484,090 A | 1/1996 | Lyshkov |
| 5,505,352 A | 4/1996 | Sisson et al. |
| 5,579,971 A | 12/1996 | Chuang |
| 5,673,833 A | 10/1997 | Ortlieb |
| D391,918 S | 3/1998 | Dunn |
| 5,810,230 A * | 9/1998 | Nutto ............................ 224/430 |
| 6,019,329 A * | 2/2000 | Edelstein ................... 248/228.3 |
| 6,095,473 A * | 8/2000 | Engers ........................... 248/339 |
| 6,299,042 B1 | 10/2001 | Smith |
| 6,328,190 B1 * | 12/2001 | Lohr ............................. 224/431 |
| 6,830,169 B1 | 12/2004 | Campbell |
| 6,843,396 B2 | 1/2005 | Champagne |
| 2009/0014489 A1 * | 1/2009 | Settelmayer et al. ......... 224/558 |

FOREIGN PATENT DOCUMENTS

| | | |
|---|---|---|
| WO | WO 90/12726 | 11/1990 |
| WO | WO 93/24358 | 12/1993 |
| WO | WO 02/38436 | 5/2002 |
| WO | WO 2006/097738 | 9/2006 |

\* cited by examiner

BICYCLE PANNIER MOUNTING SYSTEM

BACKGROUND OF THE INVENTION

The present invention relates generally to bicycle accessory carriers and, more particularly, to a bicycle pannier mounting system.

Interest in recreational and/or competitive cycling continues to increase. The consequence of this popularity of bicycle riding has been a growing presence of bicycle operators or riders or cyclists, of all ages, on public roads or off road trails. Further, as the recreation has grown, typical bicycle excursions or trips have lengthened in extent and, concomitantly a great variety of lighter, multi-geared and faster bicycles have entered the marketplace. Increasingly, as the utility and recreation of bicycling experiences resurgence, trips of longer durations and distances are common as is rider preference to carry several accessories with them during such trips. Increasing, riders in urban as well as nearby suburban areas have returned to bicycling as an efficient and inexpensive means to commute to and from work.

Traditionally, a bicycle rack that extended rearward of the seat, or racks or baskets that extended forward relative to the handlebars along the front wheel were sufficient to satisfy the accessory carrying needs of many riders. However, such systems are not without their respective drawbacks. Commonly, transporting materials in such racks required that the materials first be packaged in a portable container such as a duffle bag or backpack to allow the user to conveniently transport the materials upon arriving at a destination. Furthermore, such supplemental packaging was often required to protect the materials from the environment associated with the ride, i.e. inclement weather conditions and/or road debris thrown up by the tires. Furthermore, such racks had limited capacity in as much as the rider could carry as many materials as would securely remain on the rack or the basket.

A saddle bag system or a pannier commonly interacts with such racks and increases the functionality and utility of the accessory carrying system by only minimally interfering, if at all, with the capacity of the rack. Many panniers commonly include a catch or latch system that secures the pannier container to the bicycle rack. Unfortunately, such mounting systems are commonly configured to interact with specific rack constructions. That is, the securing means associated with the pannier is often tailored to engage a rack rail having a specific cross-sectional shape. Such a feature significantly limits the functionality of the pannier system by limiting the pannier to use with a given user's rail configuration.

Many such systems also commonly require the independent manipulation of multiple fasteners for securing the pannier to the rack. Although other systems have reduced the number of independently operable clamp systems or provide systems having multiple clamps that can be manipulated by a common operator, such pannier mounting systems commonly require interaction with other mounting means that remain secured to the bicycle even after the pannier is removed. Such systems thereby limit the use of the pannier to the bicycle equipped with the mounts lest the mounts be moved from bicycle to bicycle.

Although pannier systems having multiple clamps that are controlled by a common operator reduce the ambidexterity required to secure the pannier to the bicycle, each of the above systems can suffer from undesired disengagement of the pannier system from the bicycle. As the bicycle travels along a road, the pannier mounting system must be able to withstand accelerations of the pannier due by road conditions. Although a pannier mounting system having one or more open faced hooks can be conveniently suspended from a rack of a bicycle and are convenient for trips over generally smooth surfaces, longer trips, or trips over more uneven road surfaces require robust means for attaching the pannier to the rack. Although a number of pannier mounting systems include latches that can secure the relative position of the pannier, such systems commonly require independent operation of the latch and/or remain susceptible to becoming loose due to road vibration or the like.

Accordingly, it would be desirable to have a pannier mounting system that is simple to operate, can be secured to carrier rack rails having a variety of constructions, can be used with more than one bicycle, and can be single-handedly operated.

BRIEF DESCRIPTION OF THE INVENTION

The present invention provides a pannier mounting system and method of interfacing a pannier with a bicycle that overcomes one or more of the aforementioned drawbacks. A pannier mounting system according to one aspect of the invention includes a base, a handle, a pair of hooks, and a pair of catches. The handle includes a grip portion and a pair of leg that extend from the generally opposite ends of the handle. Each hook is attached to the base and slidably engaged with a respective leg of the handle. Each catch extends beyond each hook and is pivotably engaged with a respective leg of the handle such that each hook and catch defines a variable sized cavity. Translation of the handle relative to the hooks defines the space between both hook and catch pair so as to snuggly secure the pannier to a rail of a bicycle.

Another aspect of the invention useable with one or more of the features of the above aspect includes a pannier system having a container attached to a base. A handle is movably attached to the base and cooperates with a first leg of a hook. A second leg of the hook extends in an outward direction relative to the handle. A finger is pivotably attached to the handle and cooperates with the hook. A catch is also pivotably attached to the handle and is moveable relative to the second leg of the hook such that the second leg of the hook and the catch selectively open and close about a rack cavity in response to up and down movement of the handle.

A further aspect of the invention useable with one or more of the features associated with the above aspects includes a method of interfacing a pannier with a bicycle. In accordance with the method, a pair of hooks that are attached to a handle are positioned over a rail member of a bicycle structure, such as an accessory rack. Translation of the handle in a vertical direction translates an axis of rotation of a catch relative to each hook. Translation of each catch alters a size of an area generally enclosed by each hook and catch pair. The size of the area enclosed by each hook varies such that the different sized rail members can be snuggly engaged by the pannier mounting system.

A further aspect of the invention useable with one or more of the aspects above includes mounting each catch in a groove formed in each leg. A pivot secures each catch to a respective leg and cooperates with a stop that maintains a position of the catch to secure the pannier to a bicycle rail. Preferably, and end of each pivot extends from the handle and engages a groove formed in generally opposite sides of a respective hook.

Another aspect of the invention usable with one or more of the aspects above is to protect the surface of the bicycle rail to which the pannier mount is attached. Preferably, a pad interacts with those portions of the hook and catch that are positioned adjacent the structure of the bicycle. Another aspect of the invention is that, while downward translation of the handle manipulates the catch so as to secure a rail member between the catch and the hook, translation of the handle in a generally upward direction disengages a stop so that the catch opens and the pannier mounting system can be removed from the bicycle.

These and various other features, aspects, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
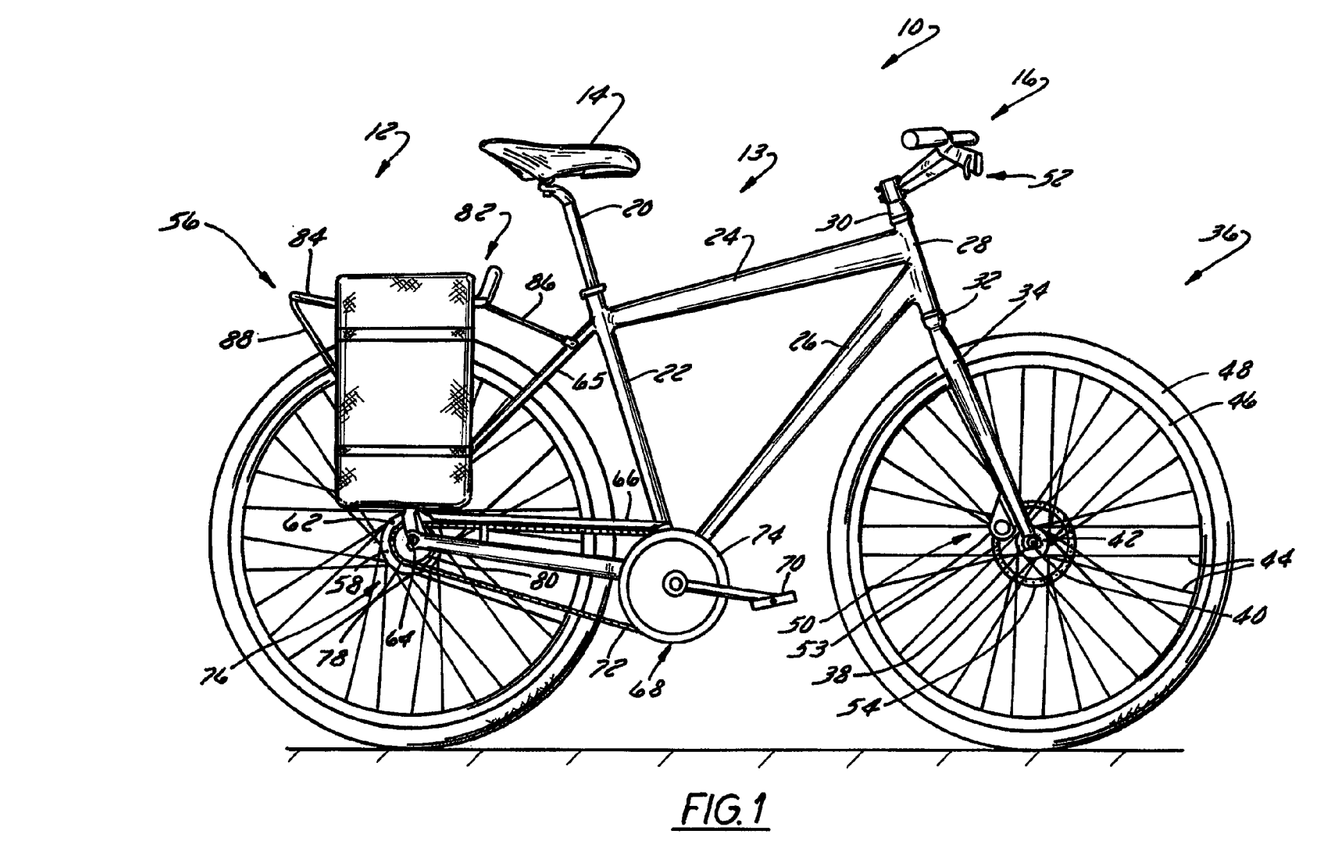
FIG. 1 is a side elevation view of a bicycle equipped with a pannier system according to one embodiment of the present invention.

FIG. 1 shows a bicycle 10 equipped with a pannier system 12 according to the present invention. Bicycle 10 includes a frame 13 that is supported by one or more wheel assemblies 36, 56 positioned at generally opposite ends thereof. As shown, pannier system 12 is positioned outboard or rear wheel assembly 56. Understandably, pannier system 12 could be configured to cooperate with bicycle 10 so as to be positioned generally adjacent front wheel assembly 36. Furthermore, although bicycle 10 is shown to have only one pannier system 12, it is envisioned that bicycle 10 could be provided with numerous pannier systems such that a number of panniers are positioned generally adjacent front and/or rear wheel assemblies 36, 56. For those riders' desiring a greater amount of accessory storage than one pannier container provides, it is envisioned that bicycle 10 include a removable pannier system adjacent each side of front and rear wheel assemblies 36, 56 such that each wheel is generally flanked by a pannier.

Still referring to FIG. 1, bicycle 10 includes a seat 14 and handlebars 16 that are attached to frame 13. A seat post 20 is connected to seat 14 and slidably engages a seat tube 22 of frame 13. A top tube 24 and a down tube 26 extend forwardly from seat tube 22 to a head tube 28 of frame 13. Handlebars 16 are connected to a stem 30 that passes through head tube 28 and engages a fork crown 32. A pair of forks 34 extend from generally opposite ends of fork crown 32 and are constructed to support front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is positioned about rim 46 such that rotation of tire 48, relative to forks 34, rotates rim 46 and hub 42.

Bicycle 10 includes a front brake assembly 50 having an actuator 52 attached to handlebars 16 and a caliper 53 positioned on generally opposite sides of a rotor or brake disc 54 that is attached to hub 42. Caliper 53 compresses one or more brake pads against disc 54 thereby providing a stopping or slowing force to front wheel assembly 36. Alternatively, it is envisioned that front wheel assembly 36 could be provided with a rim brake system wherein caliper 53 would be positioned nearer fork crown 32 and operable to engage a brake wall of rim 46.

Rear wheel assembly 56 also includes a disc brake assembly 58 wherein a rotor 60 and a caliper 62 are positioned proximate a rear axle 64 associated with rear wheel assembly 56. Rear wheel assembly 56 is positioned generally concentrically about a rear axle 64 such that rear wheel assembly 56 rotates about rear axle 64. Understandably, one or both of front wheel assembly 36 and rear wheel assembly 56 could be equipped with rim based or disc based braking systems.

A seat stay 65 and a chain stay 66 offset rear axle 64 from a crankset 68. Crankset 68 includes a pedal 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears. Gear cluster 78 is operationally connected to a hub 80 of rear wheel assembly 56 so that rider operation of pedals 70 drives bicycle 10.

A bicycle accessory rack 82 extends rearward relative to seat tube 22 of frame 13 and is located generally over rear wheel assembly 56. Rack 82 includes a body 84 that extends in a generally horizontal direction above rear wheel assembly 56. A first arm 86 extends forward from body 84 and engages seat post 20 or bicycle frame 13. A second arm 88 extends from an end of body 84 generally opposite first arm 86 and passes in a generally downward and forward direction relative to the horizontal portion thereof. Arms 86, 88 are each secured to bicycle 10 so as to maintain a generally horizontal orientation of body 84 above rear wheel assembly 56. It is well appreciated that accessory rack 82, as well as its interaction with bicycle 10, is merely exemplary and that bicycle racks usable with the present invention can have a number of shapes/configurations and cooperate with a bicycle in any of a number of manners.

Pannier system 12 cooperates with accessory rack 82 so as to be positioned generally laterally outboard relative to rear wheel assembly 56. Understandably, although accessory rack 82 is shown as being positioned generally above rear wheel assembly 56, accessory rack 82 could be configured to cooperate with the forward portion of bicycle 10 so as to be oriented generally above front wheel assembly 36. For those occasions where one or more pannier systems are desired, multiple pannier systems 12 could be engaged with one or more of the generally opposite lateral sides of one or both of forward and/or rearward positioned accessory racks 82.

Figure 2:
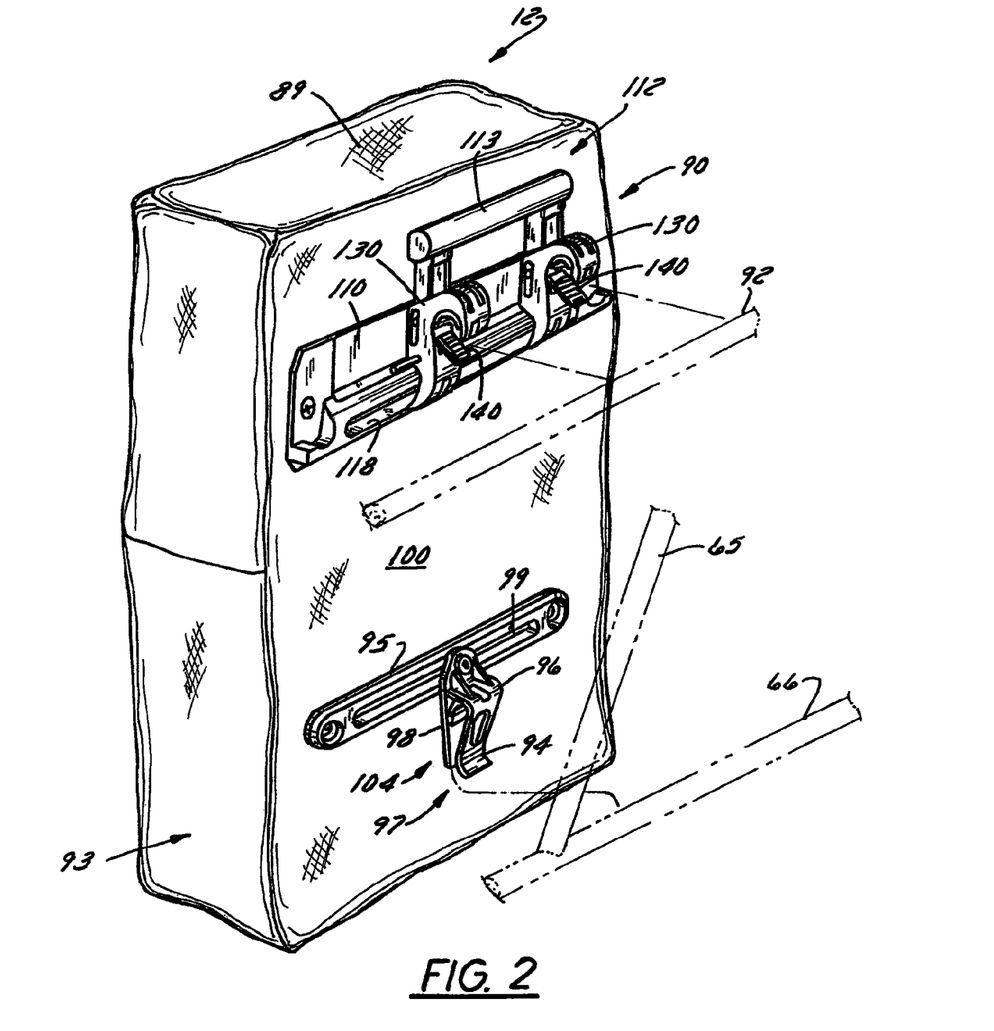
FIG. 2 is a perspective view of an inboard side of the pannier system shown in FIG. 1 with the pannier removed from the bicycle and shows the pannier mounting system.

Referring to FIG. 2, pannier system 12 includes a bag, sack, or container 89 having a mounting system 90 secured thereto. Understandably, container 89 could have a generally rigid construction, so at to maintain a desired shape, or have a more pliable construction, such as a duffle bag or robust cloth or synthetic material construction such that the container is somewhat collapsible. Preferably, mounting system 90 removably cooperates with one or more rails 92 of accessory rack 82. Alternatively, mounting system 90 could be constructed to cooperate with other bicycle structures, such as frame 13. Pannier system 12 includes an optional lower support 93 that includes one or more optional clips 94 that removably cooperate with one or more of seat stay 65, chain stay 66, and/or aims 86, 88 of accessory rack 82. Preferably, optional clips 94 are secured to a base 95 that includes an elongate groove 99 so as to be translatable relative container 89. As described below with respect to FIGS. 8 and 10, such a configuration allows riders to individualize the position of optional clips 94 for interaction with a variety of bicycle structures. Alternatively, optional clips 94 could be secured directly to container 89. Mounting system 90 and optional clips 94 cooperate with the structure of bicycle 10 and/or accessory rack 82 to generally fix a position of pannier system 12 relative to bicycle 10 when pannier system 12 is engaged therewith.

Each optional clip 94 includes a generally U or J-shaped body 96. A first portion or base portion 98 of each body 96 extends along, and is secured to base 95. Alternatively, as mentioned above, each base portion 98 could be secured directly to a bicycle facing side 100 of container 89 via fasteners such as grommets, rivets, or the like. A second portion or hook portion 102 of each optional clip 94 extends outward from base portion 98 in a generally curved manner so as to form a cavity 104 between hook portion 102 and base portion 98 with a constriction 97 positioned near the non-joined ends of each connected base portion 98 and hook portion 102. Each body 96 is constructed of a resilient deformable material such that structures of bicycle 10 or rack 82 can pass constriction 97 and be generally snuggly received in cavity 104. Alternatively, each base portion 98 or hook portion 102 could be constructed to include a tab similar to that discussed below with respect to FIGS. 7, 8, and 10 that would bias the bicycle or rack structure into the other of the respective base or hook portion 98, 102. As described further below, such tabs are preferably secured to the underlying structure via a living hinge or the like such that the tab can non-permanently deflect with respect to the cavity 104 so as to allow cavity 104 to interact with structures of various sizes and shapes in a generally snug manner.

Figure 3:
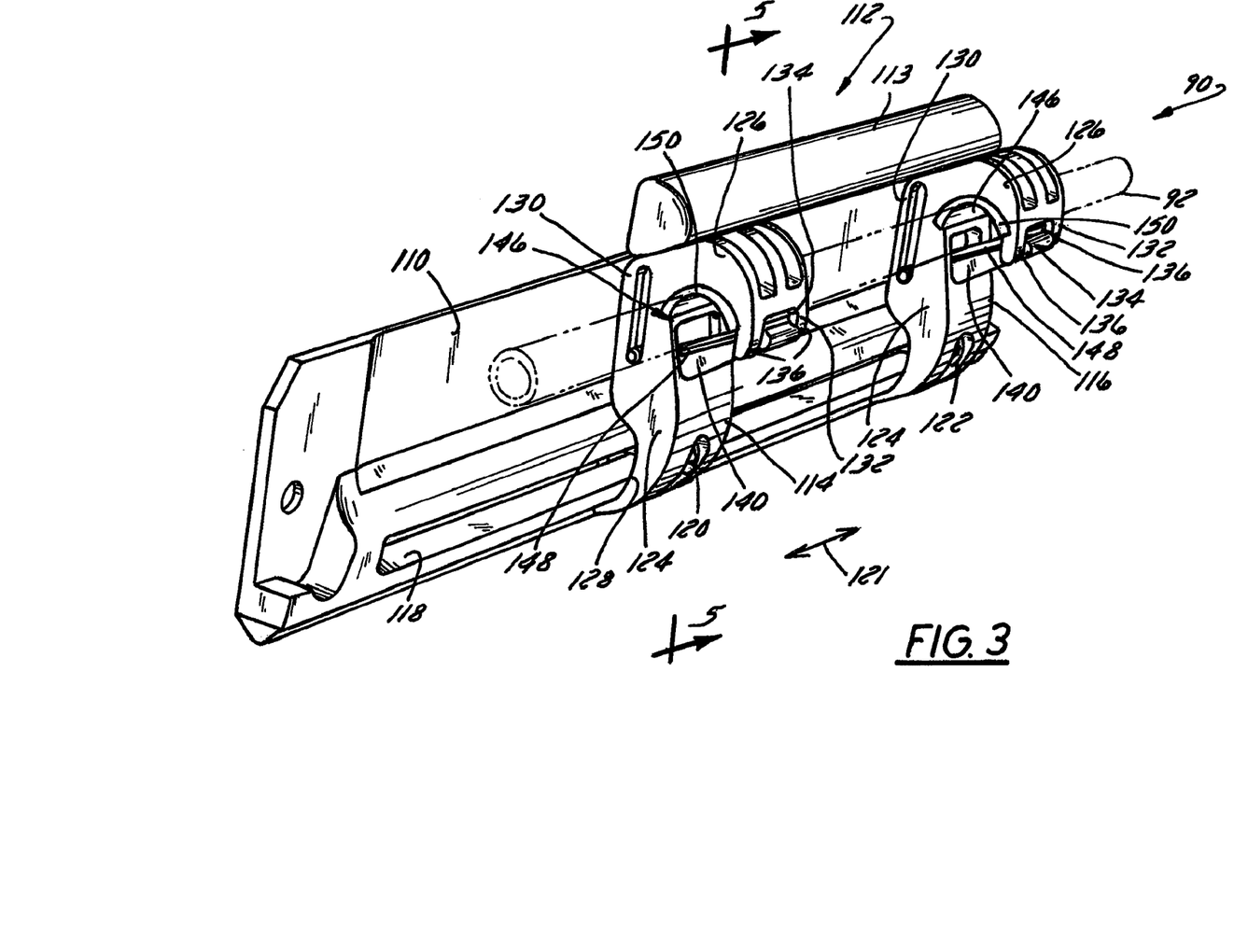
FIG. 3 is a perspective view of the pannier mounting system shown in FIG. 2 with the mounting system removed from a pack of the pannier system.
Figure 4:
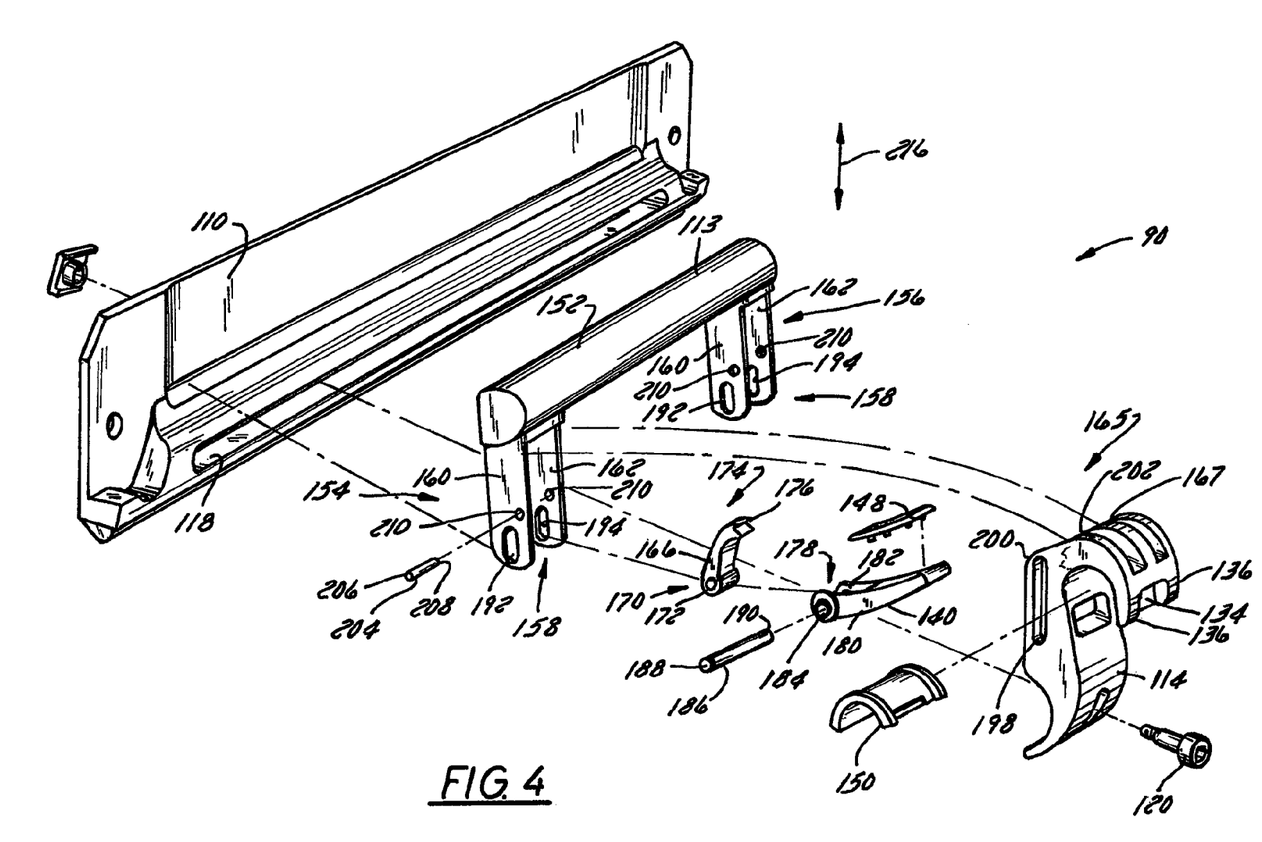
FIG. 4 is a perspective view of one of the hook assemblies of the pannier mounting system shown in FIG. 2 exploded from a base and handle.

Referring to FIGS. 2-4, the upper hooks of mounting system 90 are supported by a base 110 that is secured to container 89. Alternatively, each hook could be individually secured directly to container 89. A hook and handle assembly 112 is secured to base 110 and includes a moveable handle 113, a first hook 114, and a second hook 116. Base 110 includes a channel 118 that cooperates with a fastener 120, 122 associated with each respective hook 114, 116. Channel 118 allows translation of hook and handle assembly 112 relative to base 110 such that hook and handle assembly 112 can be individualized to a respective container 89 or for a desired interaction with bicycle 10 and/or rack 82. Hook and handle assembly 112 can be translated laterally, as indicated by arrow 121 (FIG. 3), relative to base 110, to correspond to the structure with which it is to interact.

As shown in FIG. 3, each hook 114, 116 of mounting system 90 is generally U or J-shaped and includes a first or base portion 124 that generally overlies base 110 and a second portion or hook portion 126 that extends outwardly from base portion 124. A lower section 128 of base portion 124 generally overlies and corresponds to a shape of base 110 proximate channel 118. The interaction of lower section 128 with base 110 ensures hooks 114, 116 are maintained in a generally upright orientation wherein hooks 114, 116 remain in a perpendicular orientation relative to base 110. The contoured interaction between base 110 and lower section 128 of hooks 114, 116 prevents undesired rotation of the respective hooks 114, 116 about a respective fastener 120, 122.

An upper section 130 of each hook 114, 116 is constructed so that handle 113 slidably cooperates therewith. Each hook portion 126 extends outward from upper section 130 in a generally curved manner so that each hook portion 126 generally overlaps a portion of the upper section 130 of each hook 114, 116. A distal end 132 of each hook portion 126 includes a pocket 134 that is formed by a pair of projections 136 that extend from each hook portion 126. A catch 140 is pivotably connected to handle 113, extends through base portion 124, and selectively cooperates with pocket 134 so as to generally enclose a variably sized rail cavity 146 between each respective catch 140 and hook portion 126 pair. An optional pad 148, 150 is associated with each of catch 140 and hook portion 126 and faces a respective rail cavity 146. Optional pads 148, 150 allow compression of catch 140 about rail 92 and reduce the potential of inadvertent marring or finish blemishes to those structures enclosed by rail cavity 146.

Referring to FIGS. 3 and 4, handle 113 includes a grip portion 152 that is generally centrally disposed between a pair of downwardly depending legs 154, 156. Legs 154, 156 extend in a generally perpendicular direction relative to grip portion 152. Said in another way, legs 154 extend radially outward from a longitudinal axis of grip portion 152. Each leg 154, 156 includes a groove or channel 158 that is defined by a pair of oppositely facing sidewalls 160, 162. Sidewalls 160, 162 are spaced so as to slidably cooperate with a channel 165 that is formed in a base facing side 167 of each hook 114, 116. Channel 158 is constructed to allow the pivotable cooperation of a respective catch 140 and a finger or stop 166 with the respective leg 154, 156.

As best shown in FIG. 4, a first end 170 of each stop 166 includes an opening 172. An opposite end of each stop 166 is forked and includes a groove 176 formed thereat. An axis of opening 172 is generally parallel to a longitudinal axis of groove 176. The axis of the opening and the groove are also generally parallel to a longitudinal axis of handle 113. First end 170 of each stop 166 cooperates with a space 178 formed between a pair of upturned walls 180, 182 of each catch 140. An opening 184 is formed in each wall 180, 182 of each catch 140. A pivot or pivot pin 186 passes through the openings 184 in walls 180, 182 and cooperates with opening 172 of stop 166 such that each respective stop 166 is pivotably connected to the corresponding catch 140. The generally opposite ends 188, 190 of pin 186 extend beyond sidewalls 180, 182 of catch 140 and rotationally and slidably cooperate with an elongated groove 192, 194 formed in the generally opposite side walls 160, 162 of each leg 154, 156 of handle 113. Ends 188, 190 of pin 186 extend beyond sidewalls 160, 162 of each leg 154, 156 and slidably cooperate with a groove 198 formed in generally opposite walls 200, 202 of each hook 114, 116. As described further below, such a construction allows each respective catch 140 to rotate relative to a corresponding hook 114, 116 during lateral translation of handle 113 relative to the respective hook 114, 116.

Still referring to FIG. 4, generally opposite ends 206, 208 of a pivot, guide, or release pin 204 are supported by a hole 210 formed in each of the generally opposite side walls 160, 162 of each leg 154, 156 of handle 113. Preferably, each pin 204 does not extend beyond the respective side walls 160, 162 of each respective leg 154, 156. Although the position of release pins 204 is generally fixed with respect to handle 113, the cooperation of pin 186 with the elongated grooves 192 of handle legs 154, 156 and the elongated grooves 198 of each respective hook 114, 116, allows catch 140 and stop 166 to pivot and translate relative to both handle 113 and respective hook 114, 116. Furthermore, pivot pin 186 allows lateral translation of handle 113 relative to each of hooks 114, 116 in a vertical direction, indicated by arrow 216, relative to container 89 and base portion 119 of mounting system 90. Simply, although handle 113 translates in a generally lateral direction, each catch 140 and stop 166 associated with hooks 114, 116 rotate and translate relative to base 110 and the respective hooks 114, 116. Such a construction allows handle 113 to be operated in generally tight quarters and, as described further below, provides for single handled operation of mounting system 90.

Figure 5:
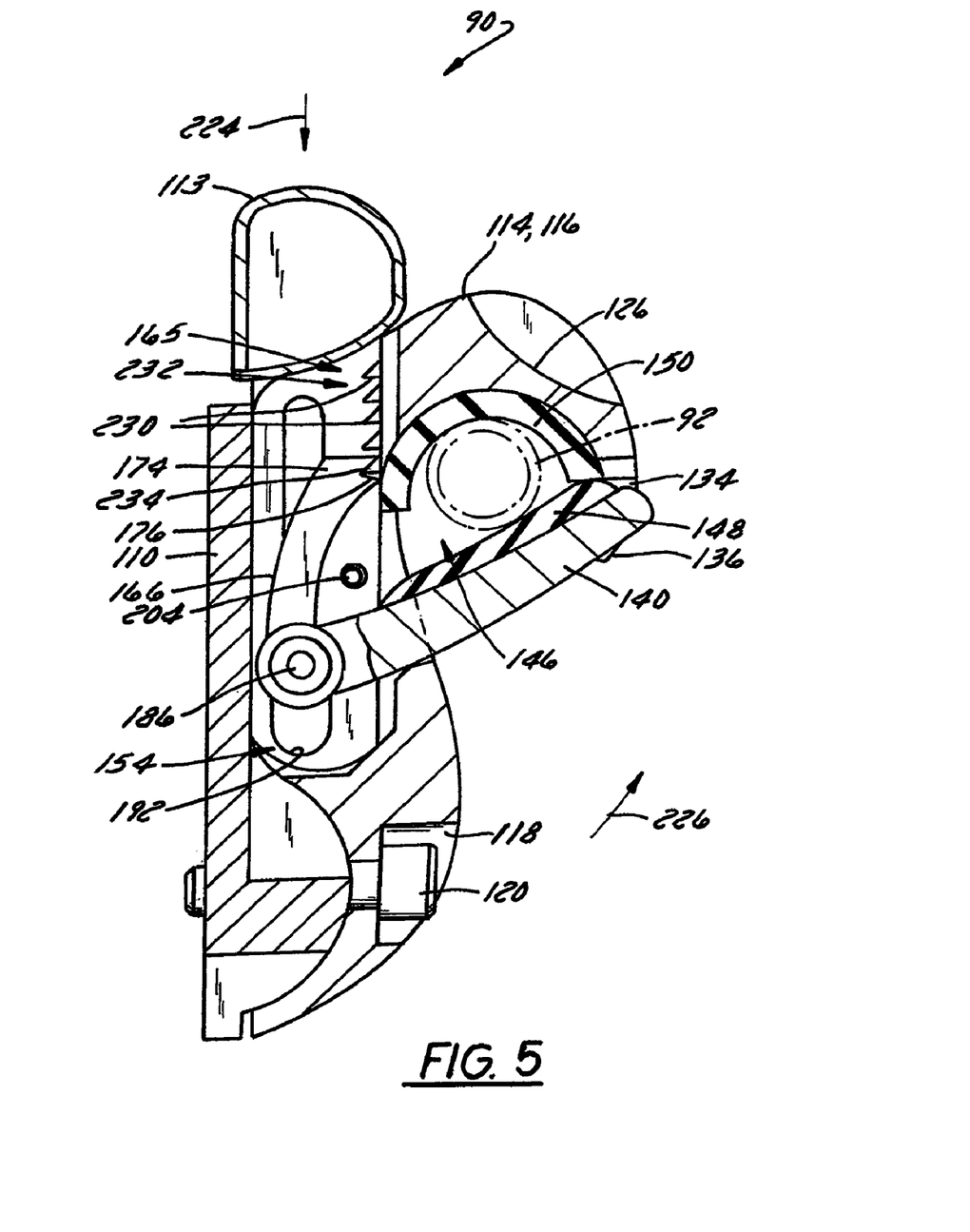
FIG. 5 is a cross sectional view of one of the hook assemblies of the mounting system taken along line 5-5 shown in FIG. 3 with the mounting system oriented in a closed position.
Figure 6:
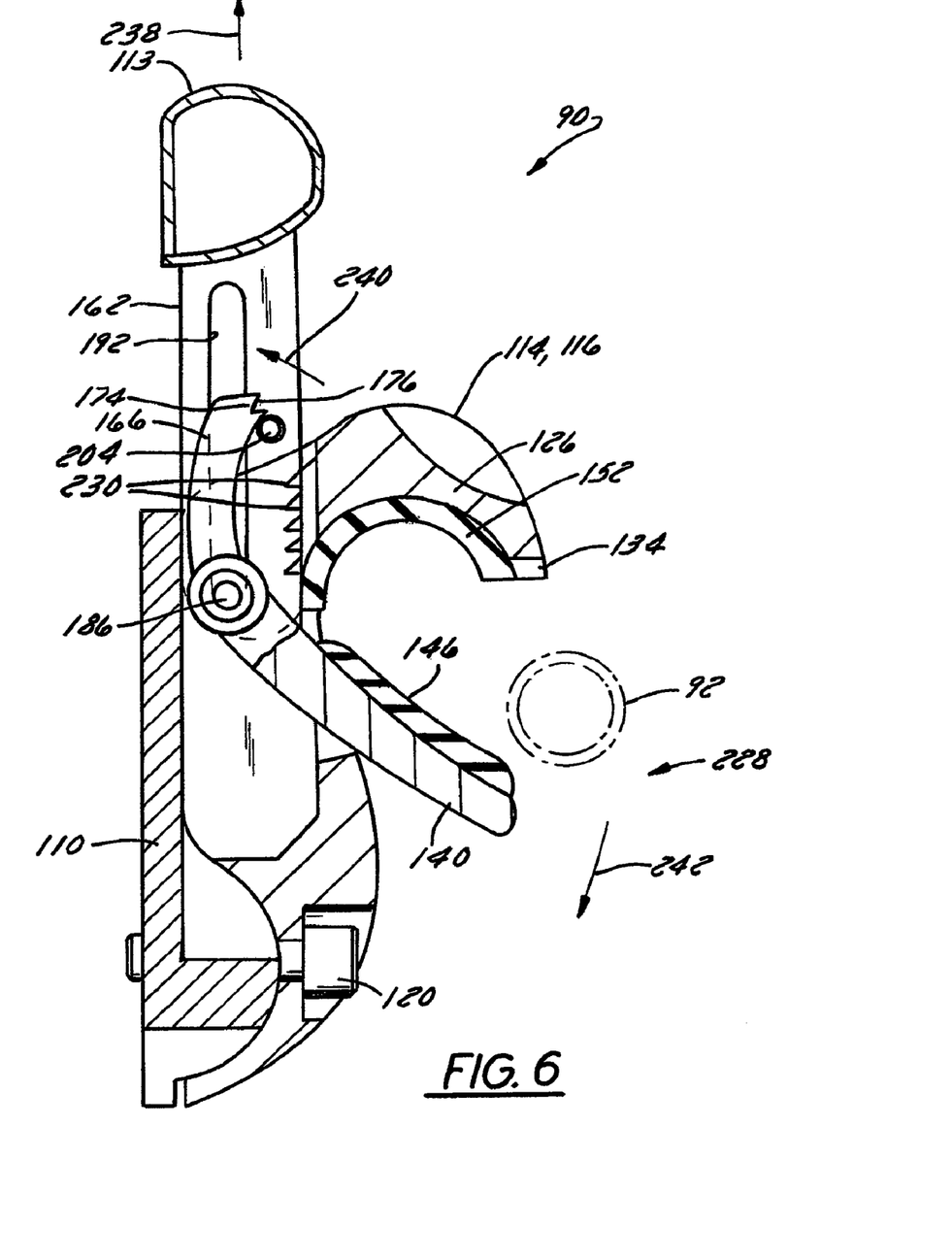
FIG. 6 is a view similar to FIG. 5 with the mounting system oriented in an open position.

With respect to FIGS. 5 and 6, securing pannier system 12 to a bicycle generally includes freely suspending mounting system 90 from a rail 92, or other generally rigid structure associated with bicycle 10. Prior to introducing pannier system 12 to bicycle 10, each catch 140 is oriented in an open position 228 (FIG. 6) such that undersides of each hook 114, 116 are generally exposed. This "open" configuration of catches 140 can be conveniently attained simply by lifting pannier system by handle 113. Translation of handle 113 in a downward direction, indicated by arrow 224 (FIG. 5), relative to base 110 and hooks 114, 116, rotates each catch 140 about pivot 186 in a closing direction, indicated by arrow 226, from open position 228.

As handle 113 is translated in closing direction 224, each pin 186 interacts with grooves 192, 194 formed in legs 154, 156 of handle 113 such that catch 140 and stop 166 translate in direction 224 until catch 140 snuggly compresses about rail 92. Understandably, for rails 92 having smaller cross-sectional areas, each catch 140 can be received within pocket 134 of a corresponding hook 114, 116. Rails having larger cross-sectional areas that do not allow catches 140 to interact with pockets 134 are also snuggly retained by pannier system 12. As the hooks 114, 116 and catches 140 cooperate with such rails in an over center manner, when pannier system 12 is closed, rail 92 is unable to shift from cavity 146.

During the "closing" operation, forked end 174 of stop 166 translates along a number of ridges or ribs 230 formed in container facing side 164 of a corresponding hook 114, 116. When catch 140 compresses about rail 92 or otherwise snuggly engages channel 134 formed in hook 114, 116 such that handle 113 can no longer translate in direction 224, groove 176 cooperates with one of adjacent ribs 230 of a corresponding hook 114, 116 and fixes the position of catch 140 relative to the corresponding hook 114, 116. When stop 166 is engaged with a respective rib 230, each respective stop 166 fixes the position of a corresponding catch 140 such that a rail 92, or other rigid structure of bicycle 10, is snuggly secured between catch 140 and a respective hook 114, 116. When closed, as shown in FIG. 5, mounting system 90 snuggly engages the structure positioned in rail cavity 146 in a generally fixed manner. Such a construction allows mounting system 90 to interact with rails or other bicycle structures in a secure manner that is generally independent of the specific size and shape of the structure that is engaged therewith.

Referring to FIGS. 3-5, translation of handle 113 in direction 224 operates catch 140 associated with each of hooks 114, 116 so as to provide at least two locations whereby mounting system 90 is securely affixed to bicycle 10. Each of the mounting locations further provides some degree of compression of the respective structure positioned in rail cavity 146 so as to reduce the movement, shaking, or vibration of container 89 during riding.

Referring to FIGS. 5 and 6, the interaction of stop 166 with ribs 230 of respective hooks 114, 116 allows catch 140 and the respective hook portion 126 to provide a generally variable closure size and shape. For example, when groove 176 of a respective stop 166 cooperates with an upper rib 232 of a respective hook 114, 116, the corresponding rail cavity 146 will have a generally larger cross-sectional shape than when groove 176 of a respective stop 166 engages a lowermost rib 234 of a respective hook 114, 116. Preferably, ribs 230 are positioned such that rail cavity 146 snugly cooperates with 14.5 mm, 10.2 mm, 9.5 mm, and/or 8 mm diameter rails. Understandably, although such values are common to many accessory racks 82, the variable configuration provided by mounting system 90 allows pannier system 12 to be secured to virtually any structure independent of the shape and/or size of the respective structure.

As shown in FIG. 6, when it is desired to remove pannier system 12 from the underlying bicycle 10 or accessory rack 82, translation of handle 113 in an upward direction, indicated by arrow 238, translates release pin 204 relative to stop 166 and catch 140 via translation of pivot pin 186 in the elongated grooves 192, 194 associated with legs 154, 156 of handle 113. As release pin 204 contacts a hook facing side of stop 166, stop 166 is rotated toward base 110, indicated by arrow 240, so as to disengage groove 176 from a corresponding rib 230. As pivot pin 186 reaches the bottom of the elongated groove 192 (FIG. 4) during translation of handle 113 in upward direction 238, stop 166 and catch 140 translate in an upward direction relative to base 110 and respective hooks 114, 116 such that catch 140 rotates in an opening direction, indicated by arrow 242, so that rail 92 of accessory rack 82 is free to translate out of the generally non-enclosed rail cavity 146.

Mounting system 90 allows pannier system 12 to be both secured and removed from a bicycle in a single handed fashion. The operation of the multiple catches 140 of multiple hooks 114, 116 with a common handle 113 provides a mounting system 90 that is simple to operate and securely affixes a supplemental carrying case or container 89 to a bicycle. Understandably, for those rides of short duration or over otherwise generally smooth terrain, pannier system 12 can be provided with one of more optional clips 94. However, during longer rides and/or rides over comparatively rough and/or bumpy terrain, where it is desired to secure a pannier system to a bicycle in a manner than requires rider interaction to remove the storage system from the bicycle, mounting system 90 provides a robust, secure, and easily operable pannier mounting system.

FIGS. 7-10 show another mounting system 250 according to the present invention. Mounting system 250 is secured to a container or pannier 252 that includes a handle 253 secured thereto. An optional lower support 254 is secured to pannier 252 and is generally similar to optional lower support 93 shown in FIG. 2. Optional lower support 254 includes one or more optional clips 256 that removably cooperate with one or more of seat stay 65, chain stay 66, and/or arms 86, 88 of accessory rack 82. Preferably, optional clips 256 are secured to a base 258 that includes an elongate groove 260 such that optional clip 256 are translatable relative container 89. As described below with respect to FIGS. 8 and 10, such a configuration allows riders to individualize optional clips 256 for interaction with a variety of bicycle structures. Similar to mounting system 90, mounting system 250 and optional lower support 254 cooperate with the structure of bicycle 10 and/or accessory rack 82 to generally fix a position pannier system 12 relative to bicycle 10 when pannier system 12 is engaged therewith.

Figure 7:
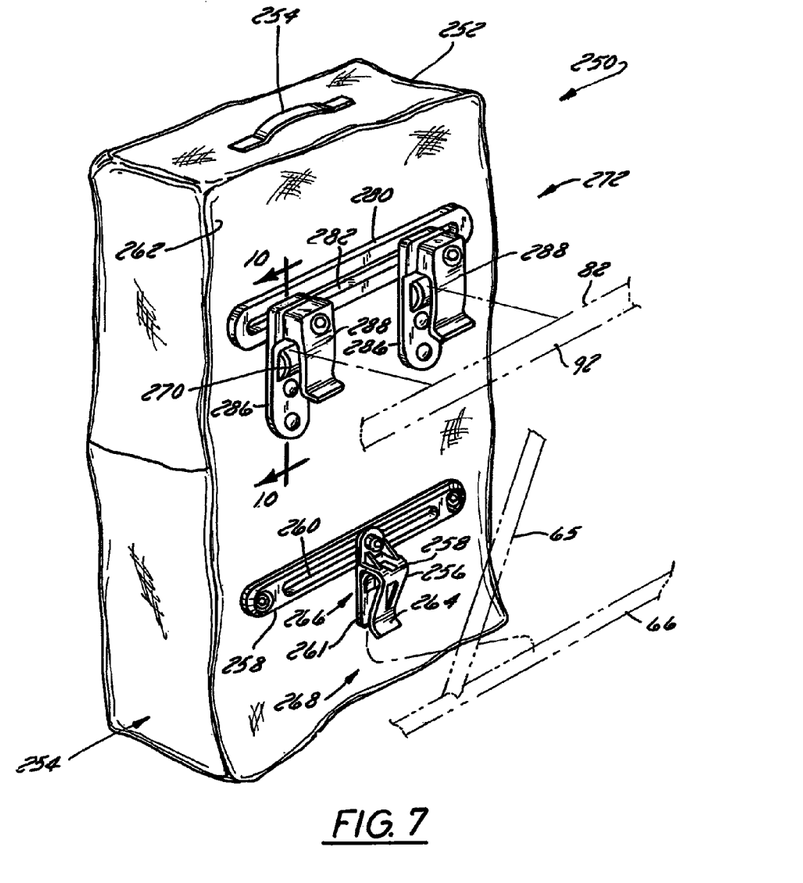
FIG. 7 is a view similar to FIG. 2 of a pannier mounting system according to another embodiment of the invention.

Each optional clip 256 includes a generally U or J-shaped body 257. A first portion or base portion 261 of each body 257 extends along, and is secured to base rail 258 secured to pannier 252. Alternatively, each base portion 261 could be secured directly to a bicycle facing side 262 of container 252 with permanent fasteners such as grommets or rivets, or removable fasteners such as nut and bolt pairs or screws.

A second portion or hook portion 264 of each optional clip 256 extends outward from base portion 261 in a generally curved manner so as to form a cavity 266 between hook portion 264 and base portion 261 with a constriction 268 positioned near the non-joined ends of each connected base portion 261 and hook portion 264. Each body 258 is constructed of a resilient deformable material such that structures of bicycle 10 or rack 82 can pass constriction 268 and be generally snuggly received in cavity 266. Alternatively, each base or hook portion 261, 264 could be constructed to include a tab 270 as described below with respect to a number of clip assemblies 272 that are constructed to cooperate with bicycle or rack structures having variable sizes and shapes.

Still referring to FIG. 7, clip assemblies 272 of mounting system 250 cooperate with a base rail 280 that is secured to pannier 252. A groove 282 is formed in base rail 280 such that clip assemblies 272 can be movably positioned related to pannier 252. As described below with respect to FIG. 8, a number of post assemblies 283 are provided wherein each post assembly cooperates with one of a number of holes 292 formed in a base 286 of each clip assembly 272. Each post assembly 283 slidably cooperates with groove 282 formed in base rail 280. Alternatively, each clip assembly 272 can be secured directly to pannier 252 or base rail 280 with more permanent fasteners such as grommets, rivets, or the like.

Figure 8:
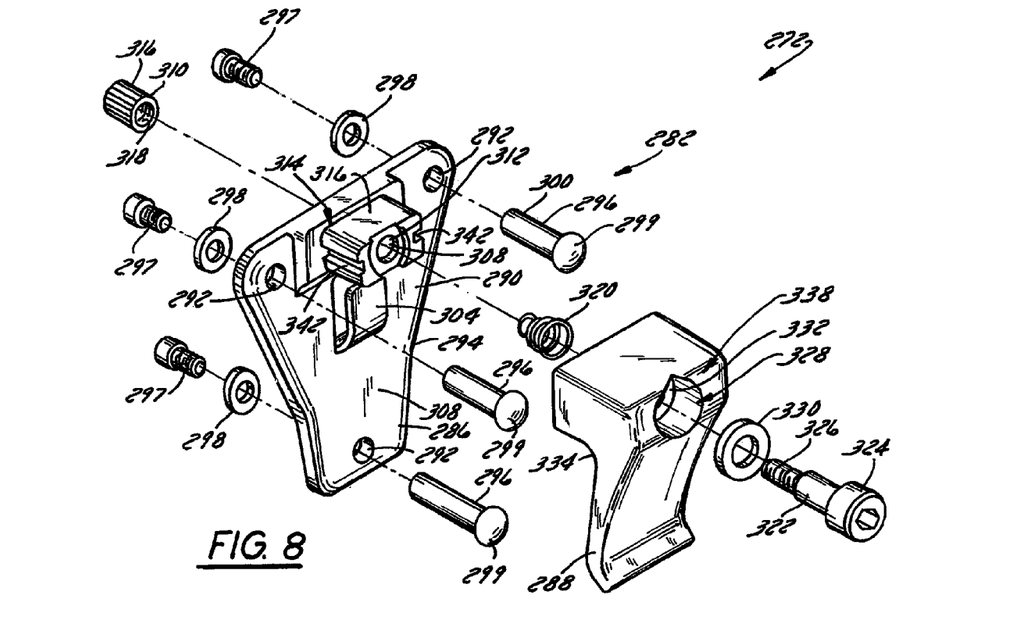
FIG. 8 is an exploded perspective view of one of the hook assemblies of the pannier mounting system shown in FIG. 7.
Figure 9:
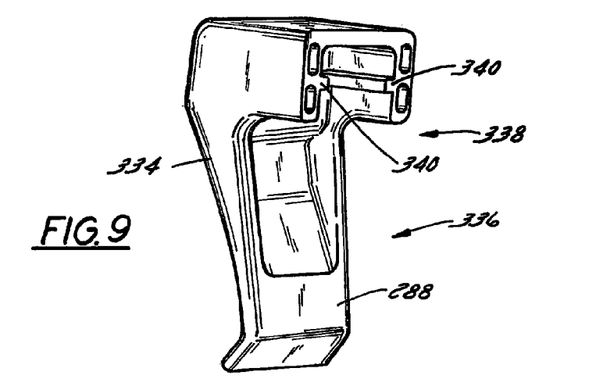
FIG. 9 is a perspective view of a side of a movable portion of the hook assembly shown in FIG. 8 that cooperates with a post that extends from the base of the hook assembly.

Referring to FIGS. 7-9, each clip assembly 272 includes a base 286 and an arm 288 that is attached to each respective base. Each base 286 is constructed to be secured to pannier 252. Base 286 includes a body 290 having one or more openings 292 formed therein. Openings 292 are generally dispersed about a perimeter 294 of body 290. Each opening 292 is constructed to cooperate with a respective post assembly 283. Each post assembly 283 includes a head portion 296, a fastener 297, and an optional washer 298. Each head portion 296 includes a cap 299 and a stem 300. Stem 300 passes through openings 292 and slidably cooperates with groove 260 (FIG. 7) formed in base rail 258 (FIG. 7). Fasteners 297 engage a respective head portion 296 of post assemblies 283 such that base 286 is securely fastened to base rail 258. Fasteners 297 cooperate with groove 282 such that each of clip assemblies 272 is independently positionable relative thereto. It is appreciated that each of the upper and lower hooks/optional clips of mounting system 90 and/or mounting system 250 can be configured to cooperate with the underlying base rail in a similar manner. Understandably, unlike mounting system 90 wherein the position of each of the upper clips is related via mutual connection with handle 113, each of clip assemblies 272 and optional clips 94, 250 are independently positionable relative to their respective support rails.

As shown in FIG. 8, a tab 304 and a post 306 extend outward from a body 290 of base 286. Tab 304 is positioned generally lower than post 306 with respect to a longitudinal vertical axis of body 290 of base 286. Tab 304 and post 306 extend outward from a face 309 of base 286 that is directed toward arm 288. As described further below with respect to FIG. 10, tab 304 is contoured to bias a rail 92 or other structure of bicycle 10 toward post 306.

Figure 10:
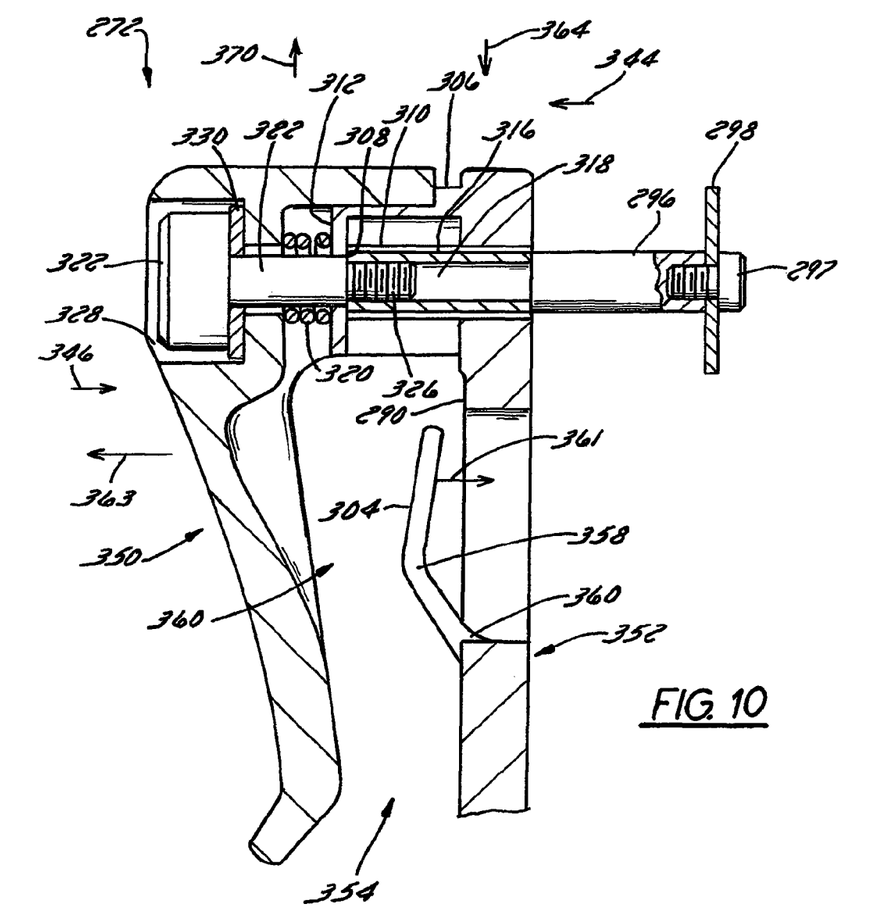
FIG. 10 is a cross-sectional view of the hook assembly taken along line 10-10 shown in FIG. 7.

As shown in FIGS. 8 and 10, post 306 includes a cavity 308 that receives a collar 310. A lip 312 is formed about an end 314 of cavity 308 so as to restrain collar 310. Preferably, collar 310 includes a fluted outer surface 316 and a threaded interior surface 318. A fastener or a bolt 322 cooperates with collar 310 and slidably secures arm 288 to base 286. A spring 320 is positioned about a portion of bolt 322 that passes between arm 288 and post 306. Spring 320 prevents bolt 320 from becoming loose during use of bicycle 10 and biases arm 288 away from base 286 as a user adjusts the size of a rail engaging cavity 354 via manipulation of bolt 320. Bolt 322 includes a head portion 324 and a stem portion 326 having a number of threads formed at least at an end thereof. Stem portion 326 of bolt 322 passes through an opening 328 formed in arm 288 of each clip assembly 272. An optional washer 330 uniformly distributes the load associated with head portion 324 across a land 332 formed about opening 328. Land 332 is generally recessed with respect to a body 334 of each arm 288 such that head portion 324 of fastener 322 does not extend beyond the body 334 of each respective arm 288. Understandably, although bolt 322 is shown as what is commonly understood as an Allen bolt, bolt 322 could be configured as any of a number of other types of fasteners such as hex bolts, screws, or like.

As shown in FIG. 9, a base facing side 336 of each body 334 of each arm 288 includes a pocket 338 formed generally about opening 328. A rib 340 extends into pocket 338 of body 334 at generally opposite lateral horizontal sides thereof. Referring back to FIG. 8, ribs 340 slidably cooperate with a groove 342 that is formed in the generally horizontally laterally opposite sides of post 306. The cooperation of ribs 340 with grooves 342 ensures that arm 288 maintains a generally longitudinal alignment with base 286 throughout the range of motion of arm 288 relative to base 286 as described below.

As shown in FIG. 10, fastener 322 passes through arm 288 and operationally engages collar 310. Lip 312 interferes with translation of collar 310 in a direction toward arm 288, indicated by arrow 344. Spring 320 pushes outward on arm 288 such that collar 310 is biased into engagement with lip 312 or in a direction generally away from pannier 252. By manipulating the head portion 324 of bolt 322, a user can alter the amount of bolt 322 that extends between arm 288 and collar 310 thereby altering the shape of a rail fitting cavity 254 between arm 288 and base 286. Such a construction allows a user to uniquely configure each clip assembly 272 for relatively snug, snap-fitting engagement with a desired rail.

A lower portion 350 of arm 288 overlies a lower portion 352 of base 286. Lower portion 350 of arm 288, lower portion 352 of base 286, and tab 304 cooperatively define cavity 354 that is variably sized to cooperate with a bicycle accessory rack rail or other bicycle structure. Tab 304 and arm 288 are deflectable in generally opposite directions so that clip assembly 272 can cooperate with accessory rack rails and or bicycle structures having a variety of shapes and or sizes. Tab 304 includes an apex 358 such that, as tab 304 extends in generally opposite directions toward base 286 away from apex 358, a constriction 360 is formed by the cooperation of the apex 358 of tab 304 with lower portion 350 of arm 288.

A living hinge 362 is formed between tab 304 and base 286 such that, when clip assembly 272 is displaced in a downward direction, indicated by arrow 364, relative to a bicycle or accessory rack structure, both of tab 304 and arm 288 can deflect in outward directions, indicated by arrows 361, 363 respectively, relative to cavity 354 to allow passage of such structures beyond constriction 360 to positions nearer post 306 of base 286. Mount system 250 can be disengaged from such structures simply by translating the pannier in an upward direction, indicated by arrow 370, relative to the bicycle or accessory rack. Compared to mounting system 90, mounting system 250 includes fewer moving parts but also provides a positive closure pressure about the structures to which it is engaged. Accordingly, mounting system 250 provides a pannier mounting system that can be efficiently and economically produced.

Each of mounting systems 90, 250 are robust and can cooperate with bicycle structures or bicycle accessory rack rails having a variety of sizes and shapes. Accordingly, each of mounting systems 90, 250 provide pannier mounting systems that are easy to operate and can be quickly moved between supporting structures that do not have the same underlying constructions. The ability of mounting systems 90, 250 to cooperate with different sized, shaped, and configured bicycle and bicycle accessory rack structures in a secure manner allows panniers equipped with either of mounting systems 90, 250 to be used by various individual users having different bicycle configurations and sizes, such as in a family environment, and are more widely adaptable across various product and supplier platforms that have dissimilar bicycle and bicycle accessory rack constructions. Furthermore, each of mounting systems 90, 250 automatically or self adjusts for cooperation with structures having a variety or shapes and sizes thereby simplifying use of panniers or containers so equipped.

The present invention has been described in terms of the preferred embodiment, and it is recognized that equivalents, alternatives, and modifications, aside from those expressly stated, are possible and within the scope of the appending claims.

What is claimed is:

1. A pannier mounting system comprising:
a base;
a handle having a grip portion and a pair of legs extending from generally opposite ends thereof;
a hook attached to the base and slidably engaged with each leg; and
a catch extending beyond each hook and pivotably engaged with a respective leg such that each hook and catch define a variable sized cavity in response to translation of the handle.

2. The mounting system of claim 1 further comprising a guide attached to each leg and positioned to cooperate with the respective catch.

3. The mounting system of claim 1 further comprising a pivot associated with each catch and cooperating with a groove formed in each leg.

4. The mounting system of claim 3 wherein the pivot extends from opposite sides of the handle into the groove formed in opposite sides of a respective hook.

5. The mounting system of claim 1 further comprising a pad positioned between facing surfaces of each hook and catch.

6. The mounting system of claim 1 further comprising a number of ridges extending from the hook and configured to cooperate with a stop pivotably attached the handle.

7. The mounting system of claim 6 wherein the stop and the catch are pivotable about a common axis.

8. A pannier system comprising:
a container;
a base attached to the container;
a handle movably attached to the base;
a hook having a first leg configured to cooperate with the handle and a second leg configured to extend outward relative to the handle;
a finger pivotably attached to the handle to cooperate with the hook; and
a catch pivotably attached to the handle and moveable relative to the second leg of the hook such that the second leg and catch selectively open and close a rack cavity in response to vertical movement of the handle.

9. The pannier system of claim 8 further comprising another hook, another catch, and another finger that are positioned at an end of the handle opposite the first hook, finger, and catch.

10. The pannier system of claim 8 further comprising a pin that attaches the finger and the catch to the hook.

11. The pannier system of claim 10 further comprising a groove formed in the first leg of the hook for engaging the pin such that the finger and catch are translatable relative to the hook.

12. The pannier system of claim 10 further comprising another pin attached to the handle between the finger and the catch.

13. The pannier system of claim 8 further comprising a number of ribs formed on the hook and configured to cooperate with the finger.

14. The pannier system of claim 13 wherein the finger includes a forked end having a groove for selectively engaging one of the number of the ribs.

15. The pannier system of claim 8 further comprising a pad attached to at least one of the catch and the second leg of the hook and facing the other of the catch of the second leg.

16. The pannier system of claim 8 wherein the second leg of the hook and the catch generally define a variably sized rack cavity defined by displacement of the handle.

17. A method of interfacing a pannier with a bicycle comprising the steps of:
positioning a pair of hooks that are attached to a handle over a rail member;
translating the handle in a generally vertical direction to translate an axis of rotation of a catch relative to each hook, the axis of rotation being slidably engaged with the handle and pivotably engaged with the catch, thereby altering a size of an area enclosed by each hook such that the rail member is snuggly engaged therebetween.

18. The method of claim 17 of further comprising translating the handle in an upward linear direction to disengage each catch from the rail member.

19. The method of claim 17 further comprising further comprising securing each of the hooks to a base securable to a container.

20. The method of claim 17 further comprising engaging a stop with an index of each hook to fix a position of a pivot associated with the axis of rotation of the catch.

21. The method of claim 17 further comprising engaging a clip with another rail member that is remote from the rail member.

* * * * *